Dec. 16, 1952    D. W. ROSS    2,621,485
MARINE STRUCTURE
Filed Feb. 21, 1947    6 Sheets-Sheet 1

INVENTOR:
DONALD W. ROSS
BY
*L. Goodwin*
ATTORNEY

Dec. 16, 1952     D. W. ROSS     2,621,485
MARINE STRUCTURE

Filed Feb. 21, 1947     6 Sheets-Sheet 2

INVENTOR:
DONALD W. ROSS
BY
*L. C. Goodwin*
ATTORNEY

Dec. 16, 1952 D. W. ROSS 2,621,485
MARINE STRUCTURE
Filed Feb. 21, 1947 6 Sheets-Sheet 3

INVENTOR:
DONALD W. ROSS
BY
*L. C. Goodwin*
ATTORNEY

Dec. 16, 1952     D. W. ROSS     2,621,485
MARINE STRUCTURE

Filed Feb. 21, 1947     6 Sheets-Sheet 4

INVENTOR:
DONALD W. ROSS
BY
*L. Goodwin*
ATTORNEY

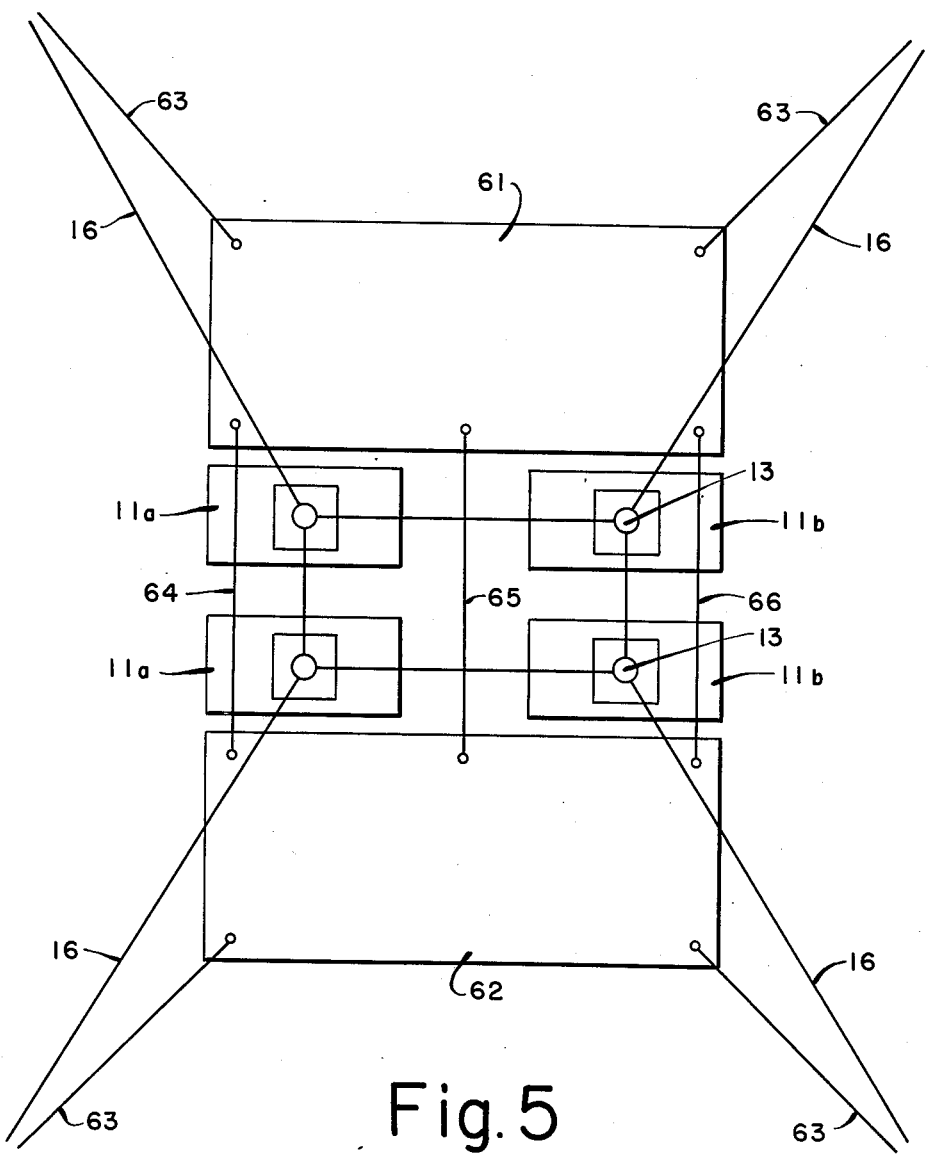

Dec. 16, 1952 D. W. ROSS 2,621,485
MARINE STRUCTURE
Filed Feb. 21, 1947 6 Sheets-Sheet 6

INVENTOR:
DONALD W. ROSS
BY
L. Goodwin
ATTORNEY

Patented Dec. 16, 1952

2,621,485

UNITED STATES PATENT OFFICE 2,621,485

MARINE STRUCTURE

Donald W. Ross, Tulsa, Okla., assignor to Stanolind Oil and Gas Company, Tulsa, Okla., a corporation of Delaware Application February 21, 1947, Serial No. 730,095

4 Claims. (Cl. 61—46)

This invention relates to a structure from which operations such as drilling operations can be carried out at a marine location, and to a method for establishing such a structure at the marine location. More particularly, the invention relates to a structure resting on the marine floor with supporting elements extending above water level and a working platform above water level on the supporting elements, and to a method for constructing such a structure at the marine location.

Frequently it is desirable to establish a working platform above water level at a marine location. For example, it may be desired to establish a working platform for well-drilling operations. In many cases the locations of interest, such as salt domes in the Gulf of Mexico, are covered by 100 or more feet of water. In order for a structure to be stable in such a location, the base of the structure resting on the marine floor should be of about the same dimensions as the water depth. Preferably the lateral dimensions of the base is even greater than the water depth to give adequate stability against the action of ocean currents, waves, and wind.

It is possible, of course, to use a much smaller base on the marine floor and obtain lateral stability through use of guy lines, or other bracing means. However, guy lines may be sheared, as by passing boats. They may also become weakened by corrosion and break. The anchors to which the lines are attached may creep or pull loose altogether. Therefore, it does not appear advisable to entrust the entire stability of a large, expensive structure to guy lines. The expense of a drilling rig will also be involved. The safety of the drilling crew must also be considered. The advisability of deriving the major support for a marine structure from supports widely spaced on the marine floor becomes apparent from these considerations.

A stable structure requires several widely spaced supporting elements, each support having foot means for giving adequate vertical support on the relatively soft marine floor. Each supporting element must usually be quite long, for example 100 feet in length, to extend above water level and should be cross-braced to other supporting elements for lateral support. Such a structure will be very bulky and expensive. If wells which are drilled from the structure prove to be economically productive, it will probably be advisable to leave the structure in place for use in producing the wells. If the wells are not economically productive, it will be desirable to recover as much of the structure as possible. Obviously, large bulky structures are not easily recoverable.

If the large structure is built as a unit, it will be difficult to transport to the desired marine location without the use of special equipment built for the specific purpose of handling the structure and having little other utility. When at the marine location, it will be almost impossible to control the structure with standard marine equipment while setting the structure on the marine floor. Special means will be necessary for breaking the structure loose from the marine floor if it is desired to recover the structure. If these means fail, standard marine salvage equipment will be incapable of giving much assistance in recovering the structure, due to the large size of the structure. Some means will be necessary to cause the bottom of the structure to conform to a sloping or uneven marine floor so the entire structure will not tilt due to a sloping floor, or excessive pressure be brought to bear on high points of an uneven floor.

If the structure is transported in small parts and assembled at the marine location to avoid the difficulties of transporting and setting a large structure, considerable time will be required to set up the structure. If the structure is built from the bottom up, divers will be required, adding greatly to the time and expense required in the construction. If divers are required, the depth of water in which the structure can be built is restricted to depths at which divers can work. The structure may also be built from the surface down, being supported on guide elements or barges until the main structure supports reach the marine floor. It is well known that, due to the action of swells at sea, points a hundred feet apart on the water surface are seldom at the same level, and the relation is continually changing. Thus, parts of the structure several feet apart will be continually moving relative to each other if supported on barges. If supported from temporary supports to the marine floor, there will be continual relative motion between the structure and the work barges. Thus, building from the surface down will be an extremely hazardous occupation even in calm weather, regardless of how it is done. Until completed, the structure will probably be rather unstable, particularly if built from the surface down. Even a mild storm during the construction will be likely to destroy such a partially completed structure. If the structure is difficult to construct on location, it will be even more difficult to recover in case the location is to be abandoned.

It will be apparent that many problems and dilemmas beset one who desires to construct a stable structure for drilling operations at a marine location. It is an object of this invention to provide a structure and a method for constructing a structure which will solve many of these problems and resolve some of the dilemmas.

A principal object of this invention is to establish a stable working platform above water level in a marine location.

Another object of this invention is to provide a marine structure for drilling operations which can be easily transported and yet quickly and easily set in place.

Still another object is to provide a method by which a broad, stable marine structure for drilling operations can be constructed easily, quickly, and safely.

An additional object is to provide a foundation unit suitable for connecting to other similar units to form an integral structure as a base for a stable working platform above water level in a marine location.

It is also an object to provide a method of setting a marine structure on the marine floor, said method reducing or eliminating the danger of capsizing the structure.

Among the objects of this invention is also the provision of a marine structure which can be temporarily abandoned during construction in case of storms, the partially completed structure being capable of weathering the storm.

Provision of a marine structure and means for constructing same which require very little work by divers is another object of this invention.

A further object of this invention is the provision of a marine structure which is adaptable to an uneven or sloping marine floor.

A still further object is to provide a permanent marine anchor satisfactory for use in constructing a marine structure.

In general this invention accomplishes the above objects by employing a plurality of separate small foundation units, each small enough to be easily managed and recovered, yet each so constructed as to be entirely stable as a unit when set on the marine floor and guyed. After being set on the marine floor, the units are cross-braced to each other to form an integral structure, including a working platform, from which drilling or other operations can be carried out.

Each foundation unit includes an elongated supporting structure of sufficient length to extend from the marine floor to the desired distance above water level. To one end of the supporting structure is attached a foot member with a broad surface perpendicular to the axis of the supporting structure. The broad surface rests on the marine floor, affording support for the supporting structure and for the working platform and the load to be carried by the working platform.

A more complete understanding of the invention will be obtained by referring to the drawings and the following description of the embodiments shown in these drawings. In the drawings:

Figure 3e is a view of a complete structure employing the type of foundation units shown in Figure 3a;

Figure 5 is an elevational view of a preferred embodiment of this invention at one stage of construction.

Figure 1:
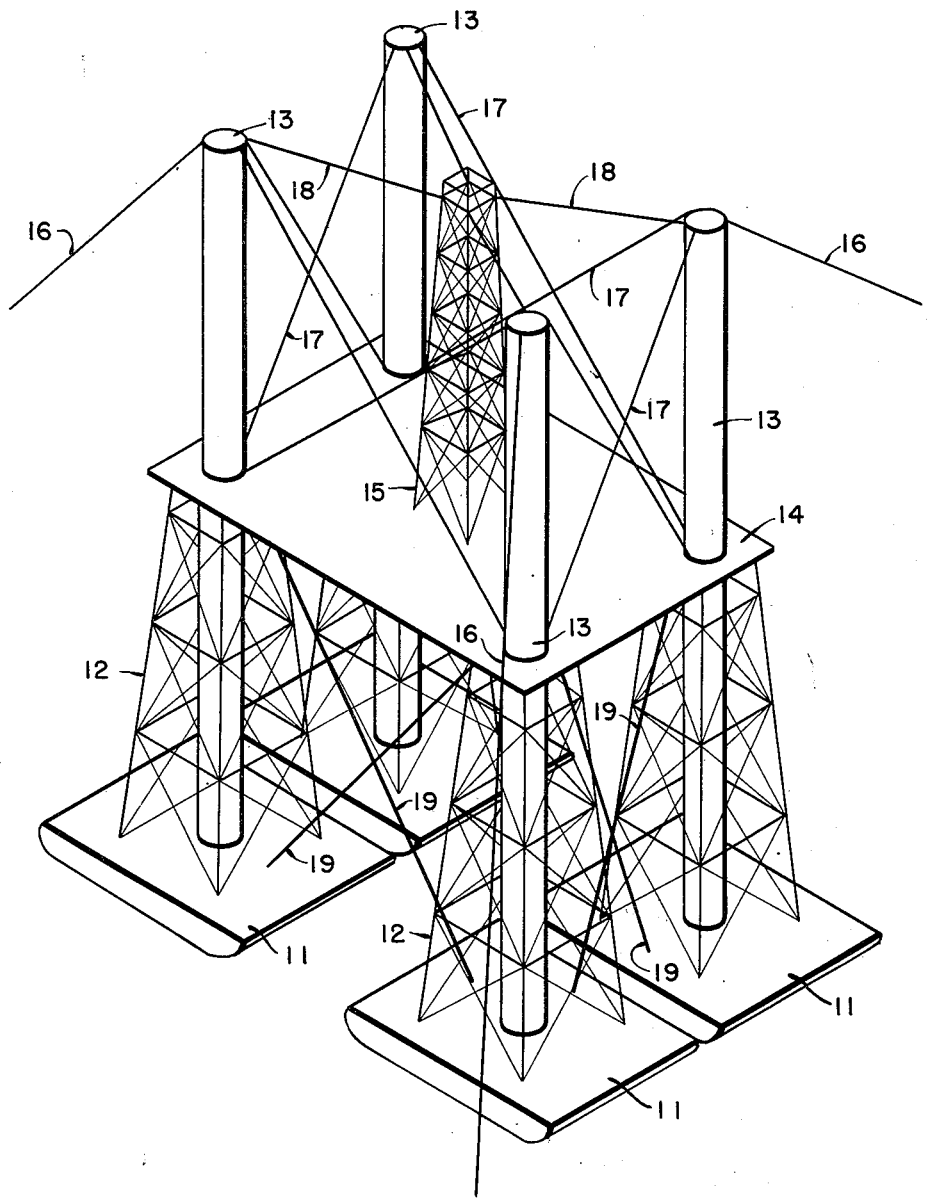
Figure 1 is an isometric view of a preferred embodiment of my invention.

Referring now to Figure 1, four barges 11 are shown resting on the marine floor. A derrick 12 is fixed to the deck of each barge. Guide columns 13 extend downward through the barges into the marine floor and upward through the tops of derricks 12. Connecting the tops of derricks 12 is working platform 14. Working platform 14 is reinforced at certain positions to support drilling derrick 15. Preferably, working platform 14 should be large enough to permit several wells to be drilled directionally from different positions of the drilling derrick 15 thereon.

Columns 13 are guyed to permanent anchors by means of lines 16. The columns are also cross-braced to each other by lines 17. Drilling derrick 15 may be guyed to columns 13, as by lines 18, or may be guyed to the working platform if preferred. Barges 11 and derricks 12 are cross-braced to each other as by braces 19.

Each barge 11 and derrick 12 make up an entirely self-sufficient and stable foundation unit, or in some cases, as described hereinafter, a unit may include two derricks. Each foundation unit can be transported to the desired marine location and set in place without aid from the other foundation units or specialized auxiliary equipment. When set in place and guyed, each unit forms a stable structure which can be temporarily abandoned in case of storm warnings without fear of its being destroyed by the storm.

In Figure 1 four foundation units are shown, but it should be clear that any number can be employed. At least three units of one derrick per barge or two units of two derricks per barge should be used in order to obtain lateral support in all directions.

Figure 2A:
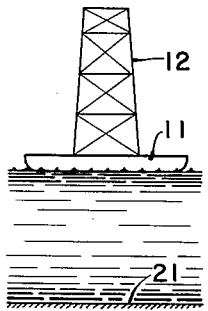
Figures 2a through 2f are elevational views of an element of the structure in various stages of being set on the marine floor.
Figure 2B:
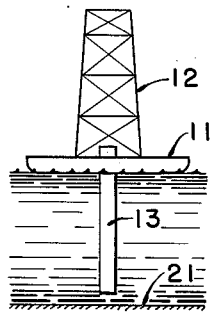

In Figures 2a through 2f a unit of the foundation is shown diagrammatically in several stages of being set in place. In Figure 2a the barge 11 and derrick 12 are shown as they arrive at the desired marine location. In Figure 2b a part of column 13 is shown extending through barge 12 and reaching nearly to marine floor 21. This column can be run through an opening in the barge in exactly the same way in which casing is run in a well. That is, the joints of the column are successively raised into the derrick, welded or otherwise coupled to the section below, and lowered through a hole in the barge.

Figure 2C:
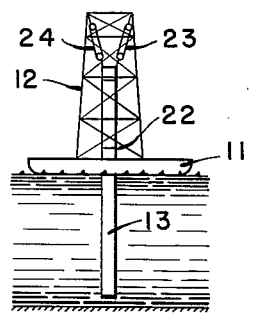

Column 13 is for the purpose of guiding barge 11 and derrick 12 to the marine floor in an upright position. Without column 13 acting as a guide, when the barge is filled with water to cause it to sink, the structure would become unstable and difficult to control and would likely capsize. It is desirable, in order to obtain more effective guiding, that column 13 pass through the top of derrick 12. Therefore, ordinary crown blocks cannot be used. Since column 13 will be only a few hundred feet long even for deep water, two light block-and-tackle sets 23 and 24 shown in Figure 2c are swung from opposite sides or corners of the top of the derrick for handling column 13. Figure 2c shows the block-and-tackle sets supporting a section of column 13 in derrick 12 in a position to be connected to the section below by welding or other coupling means at joint 22.

Figure 2D:
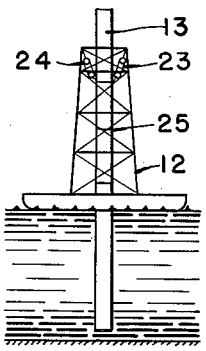

Figure 2d shows the top section of column 13 which has been raised by block-and-tackle sets 23 and 24. The top section extends through the top of derrick 12 and is connected to the section below at joint 25.

It will be noted that up to this point there is no connection between the barge and the marine floor. Therefore, any time stormy weather appears column 13 can be taken apart quickly, and the barge can be quickly moved into harbor.

Figure 2E:
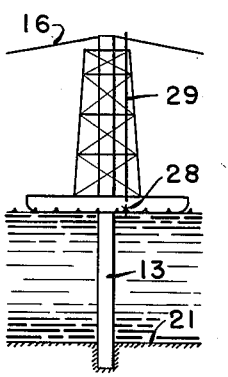

After column 13 has been completely assembled, the barge 11 is adjusted to its final desired location, guy lines 16 are attached, and column 13 is forced into the marine floor 21 by rotating the column, jetting liquid through the column, placing dead weight on the column, or by any other suitable means. Figure 2e shows the unit after column 13 has been forced into the marine floor.

Figure 2F:
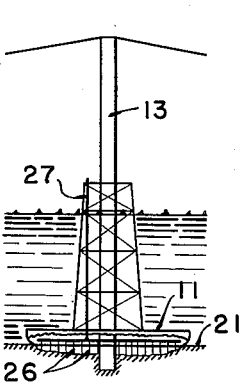

With the foundation unit in the condition shown in Figure 2e, seacocks 28 in the barge are opened and the barge and derrick slide down column 13 until barge 11 comes to rest on the marine floor 21. The rate of sinking can be controlled by pumping compressed air into the barge through air line 29. Preferably, jets 26 as shown in Figure 2f are provided on the bottom of the barge to aid in leveling the marine floor below the barge. The jets can be supplied with fluid through standpipes 27 extending above water level as shown in Figure 2f. Column 13, extending into the marine floor, serves to stabilize the barge against lateral movement.

When a foundation unit is in the condition shown in Figure 2d, it is a stable structure supported entirely on the surface of the water. When a foundation unit is in the condition shown in Figure 2f, it is a stable structure supported entirely on the marine floor. Only during the sinking of column 13 into the marine floor, attaching lines 16, and sinking the barge to the marine floor is there a period of instability or relative movement between parts of the unit. By making adequate prepaartions before beginning to sink column 13 into the marine floor, the entire period of instability and relative motion of parts of the unit can be held down to a very few minutes. It is almost inconceivable that any storm damage could occur during this brief period of instability. It is also almost inconceivable that serious injury to equipment or personnel could occur due to the motion between the column 13 and the other parts of the foundation unit if ordinary care is employed.

In Figures 2a through 2f the foundation unit is illustrated as being handled independently of any other equipment except perhaps a tugboat. If the unit is to be set in deep rough water, it is preferable to use a system such as is illustrated in Figure 5. In constructing a marine structure by use of this system, large work barges 61 and 62, perhaps 250 by 50 feet, are first brought to the marine location and anchored to permanent anchors by means of lines 63. Lines 64, 65, and 66 are provided to give complete lateral stability to the work barges 61 and 62. Line 64 is removed and foundation unit barges 11a moved into place as shown. Lne 64 is then restored, line 66 removed, and barges 11b are moved into place as shown. Line 66 is then restored. All foundation-unit barges are preferably lashed to the work barges while columns 13 are being assembled, guyed, and sunk to the marine floor, as shown in Figure 2. Foundation-unit barges 11a and 11b are then cut loose from work barges 61 and 62, seacocks opened in the foundation-unit barges, and these barges sunk to the marine floor. The separate foundation units can then be cross-braced and a working platform constructed to connect the tops of the units and form an integral, stable, supporting structure as shown in Figure 1.

Up to the time the columns 13 are completed as shown in Figure 2d, all barges can be cut loose and can be quickly moved into harbor in case of storm warnings. As soon as the foundation-unit barges are on the marine floor as shown in Figure 2f, barges 61 and 62 can be moved into harbor in case of storms, leaving the guyed foundation units as completely stable structures capable of withstanding heavy storms. Barges 61 and 62 can return at any time to aid in cross-bracing the foundation units and connecting the tops of the units by means of a working platform to form an integral marine structure. The adaptability of the structure to an uneven or sloping marine floor will be evident at this point. The working platform can be constructed level by simply attaching the platform to the various foundation units at the point necessary to make the working platform level. The foundation-unit barges, being rather small, usually about 75 by 100 feet or so, are not troubled by uneven or sloping marine floor since an area 75 by 100 feet can be leveled by means of jets on the bottom of the barge to be set on the area.

Upon completion of the working platform, the portions of columns 13 extending above the working platform may be cut off if desired, guy lines 16 being attached to the working platform 14, or the derricks 12. Preferably the barges 11 are set far enough apart that the structure will be stable without the use of guy lines 16. These lines should be retained, however, in case it is desired to recover the structure. For the same reason, the portions of columns 13 extending above working platform 14 should be left standing.

If it is desired to recover the structure, barges 61 and 62 are moved in and anchored, working platform 14 and the cross-braces removed, and water blown out of unit foundation barges 11 to cause them to rise to the surface. The jets on the bottoms of the barges aid greatly in breaking the barges loose from the bottom. In case one of the barges fails to rise, standard salvage equipment on work barges 61 and 62 will be adequate to recover the stuck foundation-unit barge.

A preferred embodiment of a foundation unit as contemplated by this invention has been described in connection with Figure 1, and preferred methods of employing these foundation units in constructing marine structures have been described in connection with Figures 2a through 2f, and Figure 5. Other foundation units may be employed for accomplishing the purposes of this invention, and other methods may be employed for setting these units on the marine floor and cross-bracing them together to form, together with a platform connecting the tops of the foundation units, a structure from which marine operations such as marine drilling can be carried out.

Figure 3A:
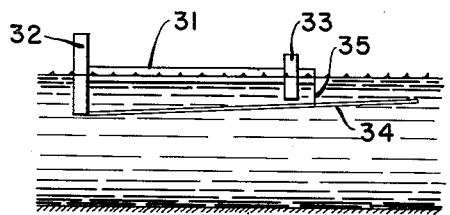
Figures 3a through 3c are elevational views of an element of an alternative embodiment of my invention in various stages of being set or as set on the marine floor.

Another form of foundation unit satisfactory for use in constructing a marine structure in accordance with this invention is shown in Figure 3a. In this figure a large hollow cylindrical column 31 has a float 32 attached to one end. The float has a flat surface of considerable area opposite the side to which the column is attached. A second float 33 is adapted to slide on column 31. One or more braces 34 employed to cross-brace the foundation unit to other units may be attached to float 32 and fastened to the top of column 31 by means of holder 35. Column 31 is preferably five feet or more in diameter, although a smaller diameter will be satisfactory for use in water less than about 100 feet in depth. The column may be internally braced if desired, or may be surrounded by reinforcing rings at points spaced along the column. Preferably, the column is sealed to cause it to float.

Figure 3B:
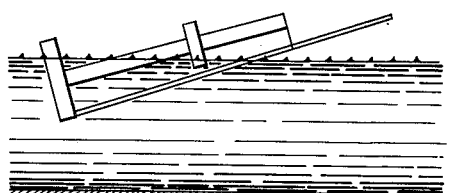

Foundation units of the form illustrated in Figure 3a are most conveniently transported to the desired marine location by allowing them to float in the water and towing them to the location by means of a tug. When near the desired location, water is admitted into float 32 which causes it to sink first to a position such as that shown in Figure 3b. After a certain amount of water has been admitted to float 32, buoyancy of the float will be insufficient to keep the float at the water surface. Float 32 will then swing downward until it is almost directly below the column 31 and float 33 as shown in Figure 3c.

Figure 3C:
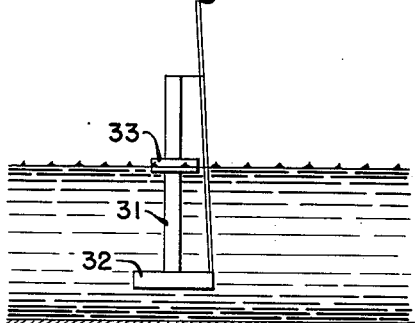
Figure 3D:
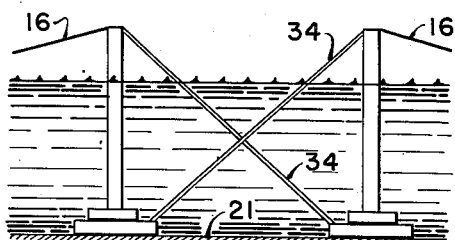
Figure 3d is an elevational view of two of the elements illustrated in Figure 3a in their final position on the marine floor, cross-braced together, ready for bracing to other foundation units, and for completion of the integral structure by the construction of a working platform connecting the tops of the several foundation units.
Figure 3E:
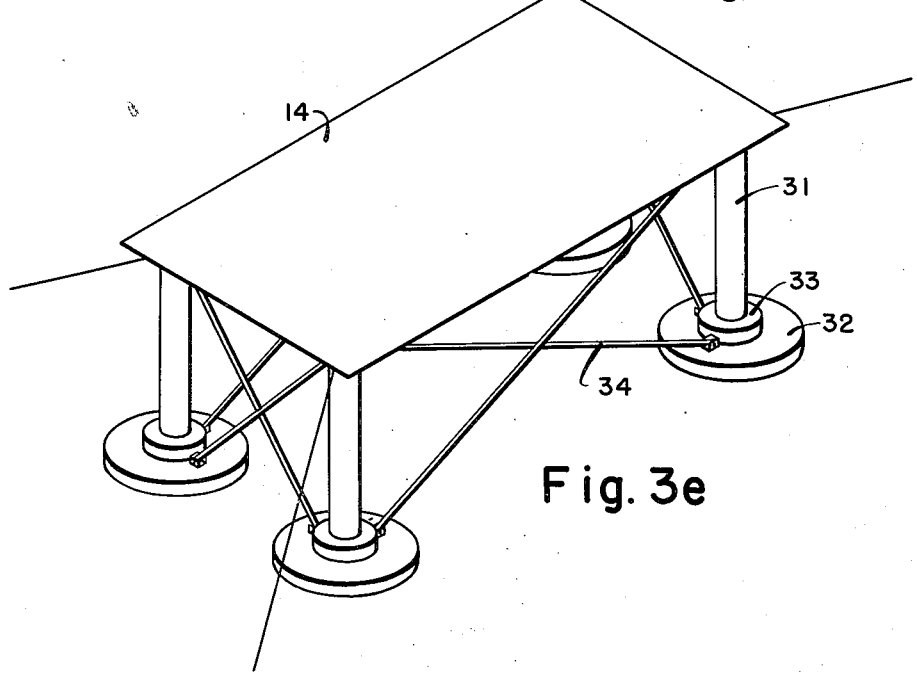

With the foundation unit in the position illustrated in Figure 3c the unit is towed to exactly the desired location. More water is then admitted to the float 32, and if desired, to column 31, causing the float 32 to come to rest on the marine floor 21 as shown in Figure 3d. Float 33 is then filled with water to cause it to slide down column 31 and come to rest on float 32. Other units are then set on the marine floor in the same manner. Upon fastening of the cross-braces 34 between the foundation units, and attaching guys 15 from permanent anchors as shown in Figure 3e, the foundation is ready for the construction of a working platform above water level as shown in Figure 3e. If it is desired to recover the marine structure shown in Figure 3e, the working platform is removed, the cross-braces removed, and the water blown out of floats 32 and 33 in that order.

Figure 6A:
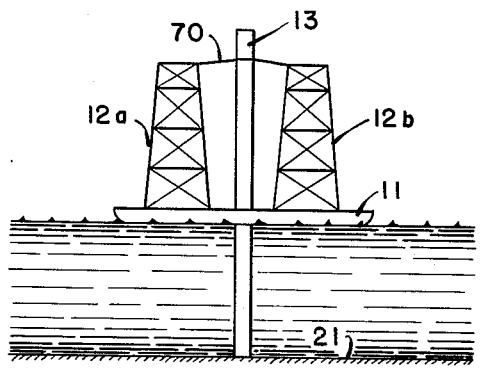
Figures 6a and 6b are views of further alternative embodiments of the invention.
Figure 6B:
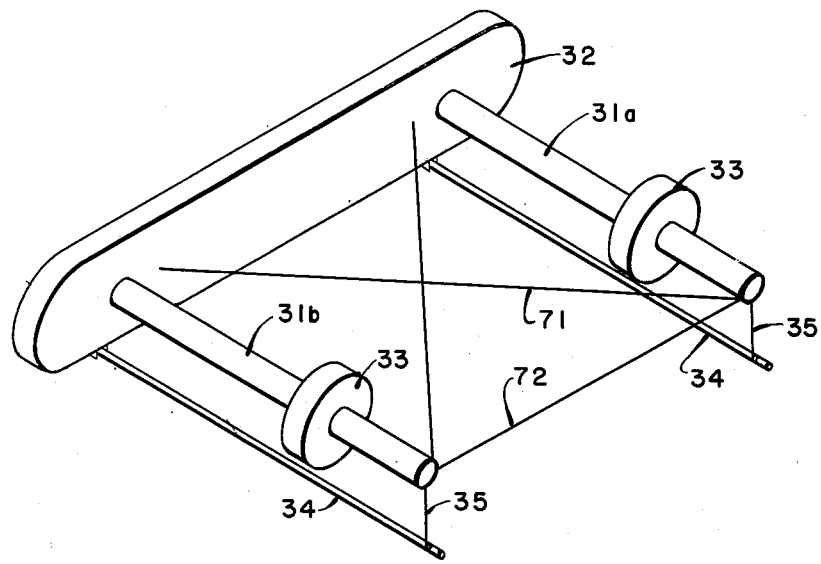

In establishing structures in most marine locations it will probably be preferred to employ foundation units including only one supporting structure per barge or footing as illustrated in Figures 2a and 3a. For use in shallow water, however, it is preferred to mount two supporting structures on a single barge or footing as shown in Figures 6a and 6b. In Figure 6a, two derricks 12a and 12b are shown mounted on a single barge 11. Guide column 13 is shown midway between derricks 12a and 12b, the top of the guide column being centered between the derricks by braces 70. It will be apparent that guide column 13 can be placed through either derrick 12a or 12b rather than being placed between the derricks. If desired, a guide column may be placed through both derricks 12a and 12b.

In Figure 6b two columns 31a and 31b are mounted on a single float 32. Floats 33 are slidably mounted on columns 31a and 31b. The two columns are cross-braced by means of braces 71 and 72. Braces 34 fastened to column 31a and 31b by holders 35 may also be provided.

In setting the foundation units shown in Figures 6a and 6b on the marine floor, procedures similar to those employed for setting the foundation units shown in Figures 2a and 3a respectively may be used. It will be apparent that only two of these dual-column units are required to afford complete lateral stability.

Figure 4:
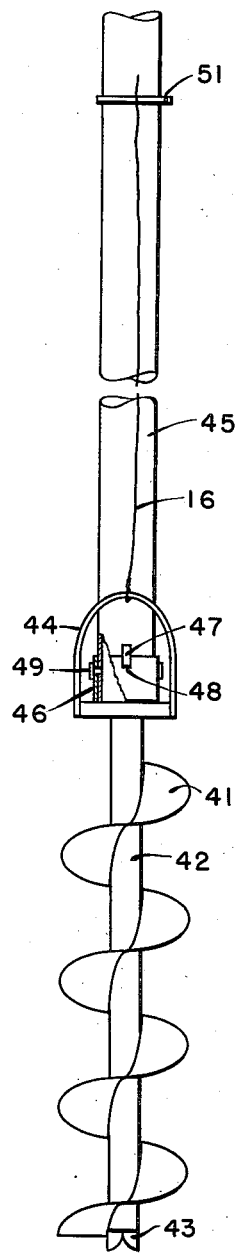
Figure 4 is an elevational view of a permanent marine anchor.

In the construction of the illustrated embodiments of the invention, guy lines to permanent marine anchors are employed. Ordinary anchors such as those used for ships or buoys are generally not suitable for use in guying large marine foundations such as those illustrated. In Figure 4 a permanent marine anchor suitable for use in guying marine foundations is shown. The principal element of the anchor is a spiral plate or blade 41 which is attached to a hollow shaft 42. A bit 43 is connected to the bottom of shaft 42. At the top of shaft 42 is a swinging bail 44. Guy line 15 extends from the bail 44 to a point above the surface of the water. The anchor is forced into the marine floor by rotating and pressing downward on the shaft 42 while jetting water downward through bit 43. Rotating torque, downward pressure, and fluid for jetting are transmitted to shaft 42 through conduit 45 extending downward from a barge at the surface of the water.

Connection between shaft 42 and conduit 45 is made through coupling 46 on the top of shaft 42. A key 47 fixed to conduit 45 slides into a slot 48 in coupling 46. This key 47 serves to transmit torque and downward pressure from conduit 45 to shaft 42 through coupling 46. To prevent the coupling from becoming disengaged from conduit 45 while the anchor is being lowered to the marine floor, coupling 46 is fixed to conduit 45 by means of shear pins 49. After the anchor has been forced into the marine floor, pins 49 are sheared by an upward pull on conduit 45. Thus, the shearing of pins 49 affords a good test of the permanency of the anchor. If the pins can be sheared without moving the anchor, the anchor is satisfactorily permanent. However, if an upward pull on conduit 45 pulls the anchor out of the marine floor before the pins shear, the anchor is not sufficiently permanent and another trial is made. The permanency of the anchor can also be tested by an upward pull on guy line 15.

The end of guy line 15 is preferably fastened to conduit 45 above water level by means of clamp 51. This permits the guy line to rotate with conduit 45. If a longer length of guy line is desired, it can be wound around conduit 45 or wound on a spool mounted on conduit 45.

Upon consideration of the described embodiments of this invention it will be seen that a marine structure is provided which is in part made up of and supported on foundation units, each foundation unit being a complete, separate structure in itself which can be made stable by use of guy lines prior to being connected into the integral structure. The foundation units can be easily transported, and yet easily, quickly, and safely set in place. They can be transported, controlled during setting, and if necessary recovered by use of standard marine gear. If necessary, the partially completed structure can be temporarily abandoned during construction with little danger of destruction by storms. Little or no work by divers is required. The structure is adaptable to being built on a sloping or uneven marine floor. A method has also been described for constructing the structure, this method taking advantage of the nature of the structure to accomplish the objects of the invention.

I claim:

1. A separately stable foundation unit resting on the marine floor and suitable for being connected to similar foundation units to form an integral structure comprising a barge resting on the marine floor, a derrick on said barge, said derrick extending above the water level, a guide column extending through said derrick and barge into the marine floor, and guy lines from the top of said guide column to permanent marine anchors set in the marine floor to stabilize said foundation unit.

2. A method of establishing on the marine floor a marine structure of the type having a supporting element resting on a floatable foot member on the marine floor, comprising establishing a guide column through said floatable foot member and said supporting element while the marine structure is floating on the water surface with the supporting element in an upright position, and causing the marine structure to slide down the guide column to the marine floor, whereby danger of capsizing of the marine structure while sinking is reduced or eliminated.

3. A method of establishing on the marine floor a barge with a derrick extending from the barge to the water surface, comprising establishing a guide element through said barge and derrick and into the marine floor while the barge is floating on the water surface, and admitting water to the barge to cause the barge and derrick to slide down the guide element to the marine floor.

4. A portable marine structure comprising a plurality of separately stable foundation units resting on the marine floor and capable of coacting with similar adjacent units to form an integral marine structure, each of said units including a floatable foot member resting on the marine floor, means for controlling the buoyancy of the foot member, a superposed derrick on said foot member, and guide means passing through said foot member and said derrick for guiding an individual unit in an upright position between the surface and the marine floor.

DONALD W. ROSS.

REFERENCES CITED

The following references are of record in the file of this patent:

UNITED STATES PATENTS

| Number | Name | Date |
| --- | --- | --- |
| 759,759 | Shepard | May 10, 1904 |
| 1,388,031 | Dray | Aug. 16, 1921 |
| 1,718,006 | Reno | June 18, 1929 |
| 2,210,408 | Henry | Aug. 6, 1940 |
| 2,248,051 | Armstrong | July 8, 1941 |
| 2,308,743 | Bulkley | Jan. 19, 1943 |
| 2,351,449 | Noble | June 13, 1944 |
| 2,352,370 | Carruthers | June 27, 1944 |
| 2,399,656 | Armstrong | May 7, 1946 |
| 2,422,168 | Kirby | June 10, 1947 |